（12) United States Patent
Westermann et al.

(10) Patent No.: US 11,468,409 B2
(45) Date of Patent: Oct. 11, 2022

(54) SYSTEM AND METHOD FOR MANAGING REPLACEMENT PARTS FOR A HEARING AID

(71) Applicant: WIDEX A/S, Lynge (DK)

(72) Inventors: Soren Erik Westermann, Espergaerde (DK); Svend Vitting Andersen, Espergaerde (DK); Anders Westergaard, Herlev (DK); Niels Erik Boelskift Maretti, Birkerod (DK)

(73) Assignee: WIDEX A/S, Lynge (DK)

( * ) Notice: Subject to any disclaimer, the term of this patent is extended or adjusted under 35 U.S.C. 154(b) by 271 days.

(21) Appl. No.: 15/625,628

(22) Filed: Jun. 16, 2017

(65) Prior Publication Data

US 2017/0286918 A1    Oct. 5, 2017

Related U.S. Application Data

(63) Continuation-in-part of application No. PCT/EP2014/078425, filed on Dec. 18, 2014.

(51) Int. Cl.
*G06Q 10/00*    (2012.01)
*G06Q 30/06*    (2012.01)
(Continued)

(52) U.S. Cl.
CPC ......... *G06Q 10/20* (2013.01); *G06Q 30/0601* (2013.01); *H04R 25/305* (2013.01);
(Continued)

(58) Field of Classification Search
CPC ............................ G06Q 10/20; G06Q 30/0601
(Continued)

(56) References Cited

U.S. PATENT DOCUMENTS 6,269,318 B1    7/2001  Geddes
8,346,630 B1 *  1/2013  McKeown ........... G06Q 10/087
                                            705/22
(Continued)

FOREIGN PATENT DOCUMENTS

EP    1 628 503 A2    2/2006
EP    2 039 216 A1    3/2009
EP    2 244 492 A2    10/2010
(Continued)

OTHER PUBLICATIONS

Convery E, Keidser G, Dillon H, Hartley L. A Self-Fitting Hearing Aid: Need and Concept. Trends in Amplification. 2011;15(4):157-166. doi:10.1177/1084713811427707 (Year: 2011).*
(Continued)

*Primary Examiner* — Michael Young
(74) *Attorney, Agent, or Firm* — Sughrue Mion, PLLC

(57) ABSTRACT

A hearing aid service system includes a personal communication device (13) acting as a gateway for one or more hearing aids (10, 11) to a remote server (25) accessible via the Internet. The hearing aids (10, 11) have a processor (121) monitoring electrical hearing aid parameters for detecting a change indicating a replacement of a hearing aid component (132; 140), and report the hearing aid component replacement to the remote server (25). The remote server (25) is tracking the consumption of hearing aid components for individual user accounts and identifies a priority item for sale depending on recorded consumption. The priority item for sale is displayed on the hearing aid control application software interface on the personal communication device (13). The remote server (25) completes the transaction based on data stored in the user account. The invention further provides a method for maintenance of a hearing aid.

30 Claims, 8 Drawing Sheets

(51) Int. Cl.
*H04R 25/00* (2006.01)
*G06Q 10/08* (2012.01)

(52) U.S. Cl.
CPC ....... *H04R 25/554* (2013.01); *G06Q 10/0875* (2013.01); *G06Q 30/0641* (2013.01); *H04R 2225/55* (2013.01)

(58) Field of Classification Search
USPC ........................................................ 705/305
See application file for complete search history.

(56) References Cited

U.S. PATENT DOCUMENTS

| | | | | |
|---|---|---|---|---|
| 8,467,555 | B2* | 6/2013 | Harsch | H04R 25/30 381/317 |
| 2003/0138109 | A1 | 7/2003 | Bindner et al. | |
| 2004/0202333 | A1 | 10/2004 | Csermak et al. | |
| 2007/0200683 | A1* | 8/2007 | Colby | G06Q 10/00 340/10.51 |
| 2012/0183164 | A1* | 7/2012 | Foo | H04R 25/70 381/314 |
| 2015/0347992 | A1* | 12/2015 | Chanyontpatanakul | G06Q 20/10 705/39 |

FOREIGN PATENT DOCUMENTS

| | | | |
|---|---|---|---|
| JP | 2003271366 A | 9/2003 | |
| JP | 2008015677 A | 1/2006 | |
| JP | 4612784 B2 | 1/2011 | |
| WO | 00/001196 A1 | 1/2000 | |
| WO | 2005/125276 A1 | 12/2005 | |
| WO | WO-2010145698 A1 * | 12/2010 | ........... H04R 25/552 |

OTHER PUBLICATIONS

International Search Report for PCT/EP2014/078425 dated Oct. 26, 2015 [PCT/ISA/210].
Written Opinion for PCT/EP2014/078425 dated Oct. 26, 2015 [PCT/ISA/237].
Communication dated Feb. 27, 2019 from the European Patent Office in application No. 14815351.3.

* cited by examiner

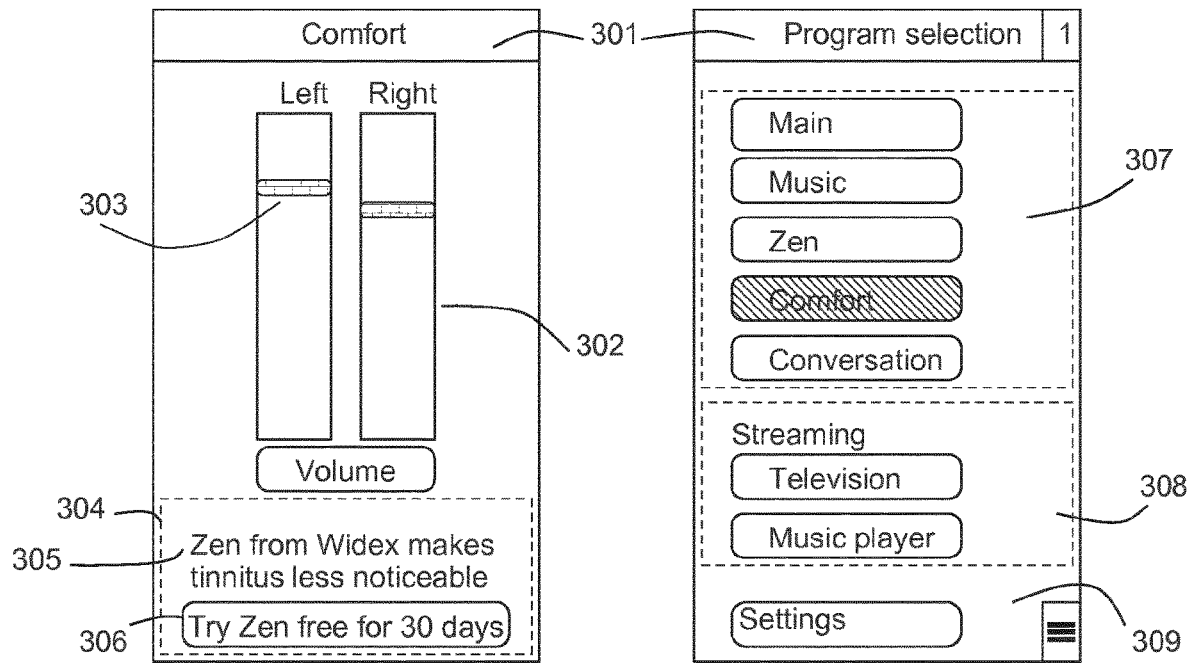
Fig. 9a  Fig. 9b
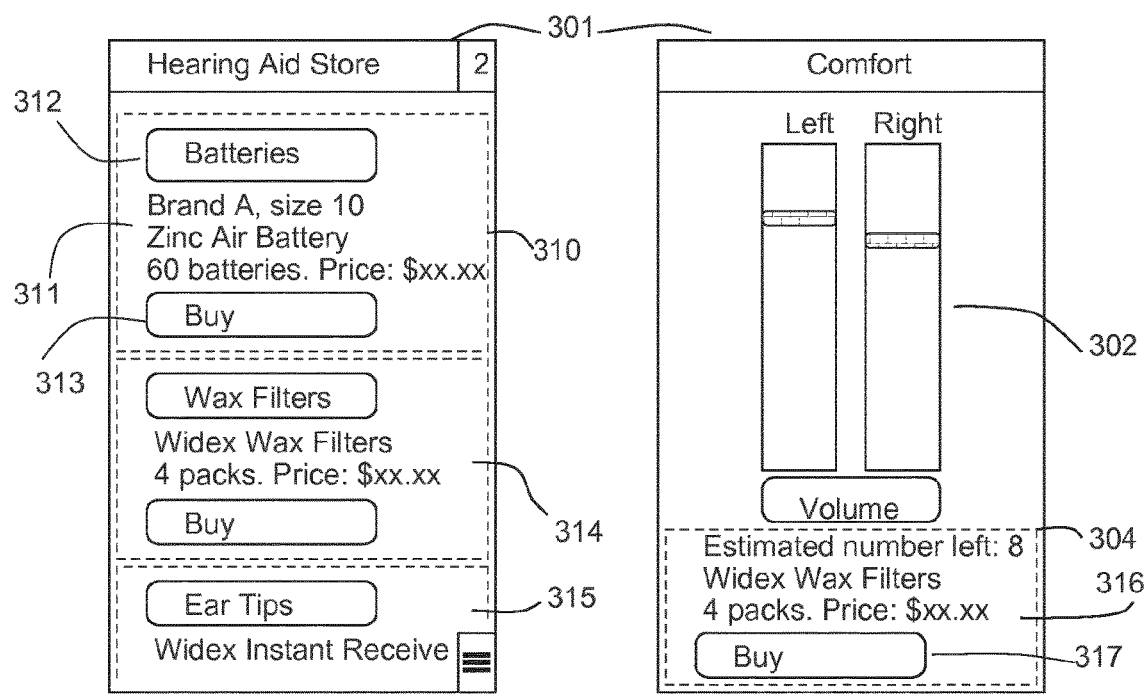
Fig. 9c  Fig. 9d

SYSTEM AND METHOD FOR MANAGING REPLACEMENT PARTS FOR A HEARING AID

CROSS REFERENCE TO RELATED APPLICATIONS

This application is a continuation-in-part of International Application No. PCT/EP2014/078425, filed Dec. 18, 2014, the contents of which are incorporated herein by reference in its entirety.

BACKGROUND OF THE INVENTION

The present invention relates to hearing aids. The invention, more particularly, relates to a method for managing replacement parts for a hearing aid. Also, the invention relates to a hearing for detecting replacement of hearing aid parts, and an on-line offering of such hearing aid parts.

Hearing aids are used in a challenging environment as the ear canal produces ear wax which may clog up the ear piece of the hearing aid. Ear wax is one of the main causes of problems in hearing aids. Most hearing aids come with a wax filter or a wax guard to prevent wax from entering the hearing instrument. The users are recommended to use the wax protection system and tools to clean away any accumulated wax every day.

The hearing aid user may have to replace the wax filter frequently, but also other parts need to be replaced—some parts often, some parts rarely—including batteries, ear pieces and sound tubes. This means that the hearing aid user has to keep track on the inventory of replacement parts he has to keep at his own premises for the daily maintenance of the hearing aid.

SUMMARY OF THE INVENTION

The purpose of the invention is to provide a hearing aid service system assisting the hearing aid user to always have the necessary replacement parts available for the daily maintenance of the hearing aid.

This purpose is according to the invention achieved by a hearing aid service system comprising an Internet enabled personal communication device and at least one hearing aid provided with respective transceivers for establishing a wireless connection, whereby the personal communication device becomes a gateway for said at least one hearing aid to a remote server accessible over the Internet. The at least one hearing aid has a processor monitoring electrical hearing aid parameters for detecting a change indicating a replacement of a hearing aid component, and reports the hearing aid component replacement via the Internet enabled personal communication device to the remote server. The remote server is managing user accounts for a plurality of hearing aid users, and is tracking the consumption of hearing aid components for the individual user account and identifies a priority item for sale. The Internet enabled personal communication device is presenting an hearing aid control application software interface to the user, and is displaying on the hearing aid control application software interface, a selection element associated with said priority item for sale. The Internet enabled personal communication device sending, responsive to a user selection, a purchase instruction concerning said priority item to the remote server for recording in the user account for execution based on user data stored in the account.

According to a second aspect of the invention there is provided a method for maintenance of at least one hearing aid being provided with a transceiver for establishing a short range wireless connection with an Internet enabled personal communication device acting as a gateway for said at least one hearing aid to a remote server accessible over the Internet. The method comprises monitoring, in a hearing aid processor, electrical hearing aid parameters for detecting a change indicating a replacement of a hearing aid component, and reporting the hearing aid component replacement to the remote server via the Internet enabled personal communication device. The method furthermore comprises managing user accounts for a plurality of hearing aid users at said remote server, tracking the consumption of hearing aid components for the individual user account and identifies a priority item for sale, presenting an hearing aid control application software interface to the user at said Internet enabled personal communication device, displaying on the hearing aid control application software interface, a selection element associated with said priority item for sale, and sending, responsive to a user selection, a purchase instruction concerning said priority item to the remote server for recording in the user account for execution based on user data stored in the account.

According to a third aspect of the invention there is provided a hearing aid having a transceiver for establishing a short range wireless connection with an Internet enabled personal communication device acting as a gateway for the hearing aid to a remote server accessible over the Internet, and a processor monitoring electrical hearing aid parameters for detecting a change indicating a replacement of a hearing aid component. Responsive to detecting the change, the processor reports the hearing aid component replacement via the transceiver to the remote server via the Internet enabled personal communication device.

According to a fourth aspect of the invention there is provided a computer-readable storage medium having computer-executable instructions. When executed on an Internet enabled personal communication device, the computer-executable instructions are adapted for presenting a hearing aid control application software interface to the user at said Internet enabled personal communication device, retrieving a replacement notification from a hearing aid monitoring electrical hearing aid parameters for detecting a change indicating a replacement of a hearing aid component, and uploading the replacement notification to the remote server. When the personal communication device receives an offer for a priority item for sale from the remote server, the computer-executable instructions, when executed the Internet enabled personal communication device, are adapted for displaying on the hearing aid control application software interface, a selection element associated with a priority item for sale, and for sending, responsive to a user selection, a purchase instruction concerning said priority item to the remote server for recording in the user account for execution based on user data stored in the account.

According to a fifth aspect of the invention there is provided a personal communication device being Internet enabled and being adapted for running application software. The personal communication device has a display for presenting a hearing aid control app interface to the user, a processor, and a transceiver for establishing a wireless connection with at least one hearing aid under guidance of said application software, whereby the personal communication device becomes a gateway for the hearing aid to a remote server via the Internet. The processor is adapted to receive a replacement notification from a hearing aid via said transceiver and upload the replacement notification to the remote server, to receive a priority item for sale offer from the remote server in response to uploaded the replacement notifications and in response hereto to display the offer in the hearing aid control app interface together with a selection element associated with a priority item for sale, and to send, responsive to a user selection, a purchase instruction concerning said priority item to the remote server for recording in an user account for execution based on user data stored in the account.

BRIEF DESCRIPTION OF THE DRAWINGS

The Invention Will be Described in Further Detail with Reference to Preferred Aspects and the Accompanying Drawing, in which:

FIGS. 9*a*-9*e* illustrate an embodiment for the hearing aid control application software interface offering priority items for sale according to the invention;

DETAILED DESCRIPTION

Figure 1:
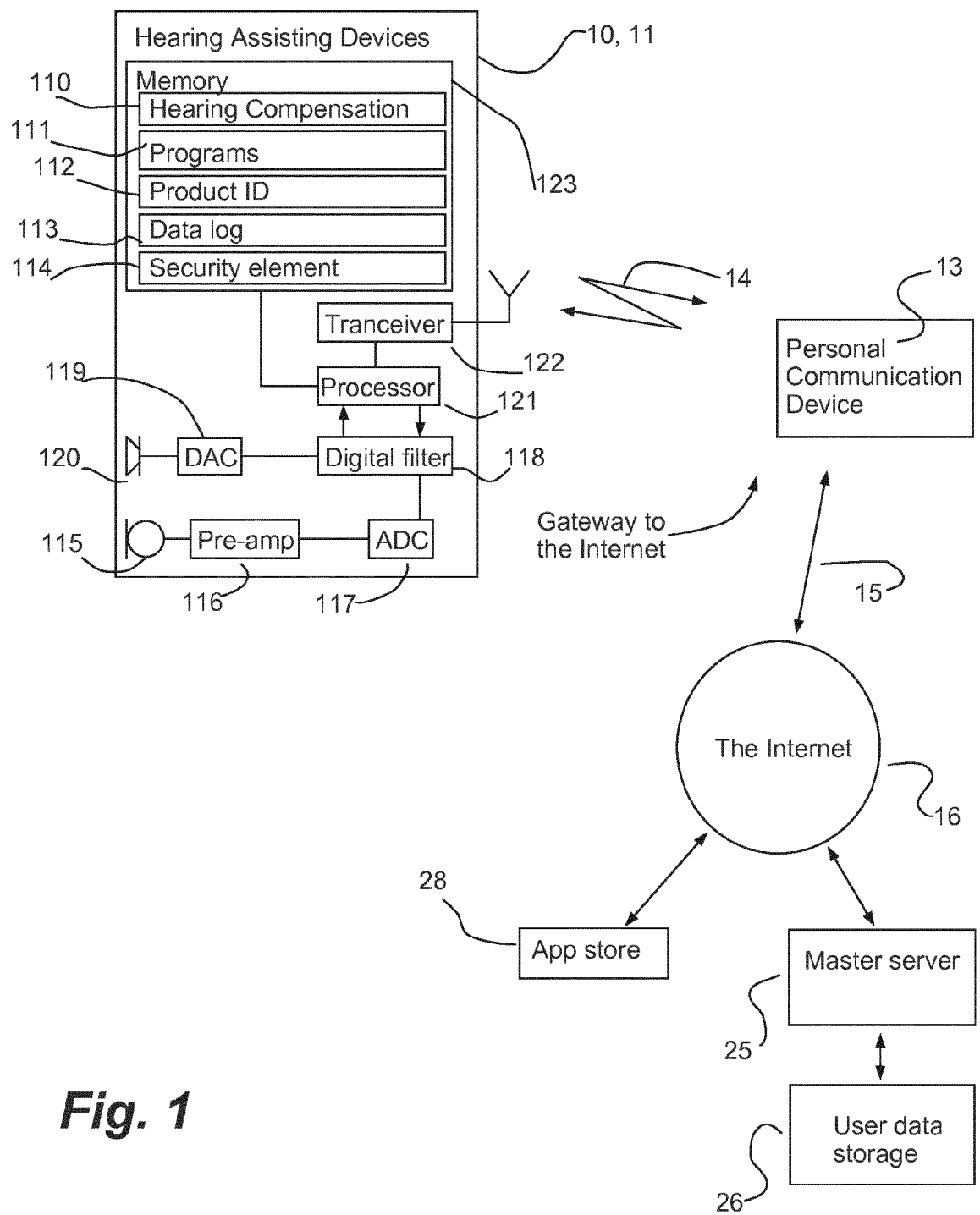
FIG. 1 illustrates schematically a data management system according to a first embodiment of the invention.

Reference is made to FIG. 1, which schematically illustrates schematically a data management system according to a first embodiment of the invention. Prior to use, the settings of the hearing aid are set and adjusted by a hearing care professional according to a prescription. The prescription is provided by an audiologist and is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

Hearing aids are often provided to a hearing impaired user as a set of binaural hearing aids 10, 11. The hearing aid 10, 11 comprises an input transducer 115 or speaker for picking up the acoustic sound and converting it into electric signals. The electric signals from the input transducer 115 are amplified in a pre-amp amplifier 116 and led to an Analog-to-Digital converter (ADC) 117 for converting the analog input signal into a digital signal. The digital output signal from the Analog-to-Digital converter 117 is fed to a digital filter 118 adapted for amplifying and conditioning of the processed signal according to a predetermined setting set by an audiologist. The output from the digital filter 118 is fed to a Digital-to-Analog converter (DAC) 119 for converting the digital processed signal into an analog output signal for reproduction by an output transducer 120 or speaker. Preferably Delta-Sigma-conversion is applied in the Digital-to-Analog Conversion so the electrical output signal is formed as a one-bit digital data stream fed directly to the output transducer 120, i.e. the output converter is driven as a class D amplifier.

The digital filter 118 may advantageously include a filter bank splitting up the signal into a plurality of filter bands (often in the range of 3-15 bands or channels) for being processed individually and subsequently combined into the output from the digital filter 118. A processor 121 monitors and controls the operation of the digital filter 118 according to the settings for alleviating a hearing loss by amplifying sound at frequencies in those parts of the audible frequency range where the user suffers a hearing deficit. These settings are provided by the audiologist, and the settings are stored as a data file 110 in a part of a hearing aid memory 123. In an embodiment, the hearing aid memory 123 is an EPROM or Erasable Programmable Read Only Memory, which is a non-volatile memory, i.e. the type of memory chip that retains its data when its power supply is switched off. It may be achieved that only authorized personnel may edit settings for alleviating a hearing loss by applying an appropriate data access control.

The hearing aid memory 123 furthermore includes memory space 111 for storing hearing aid programs or activation codes and parameters for activating one or more hearing aid programs provided as embedded software in the hearing aid 10, 11. As these parameters relate to up and down grading of hearing aid features, it is evident that the access to editing these parameters shall be limited by applying an appropriate data access control.

The hearing aid memory 123 includes memory space 112 for storing Product ID, which may include manufacturer name, product type and serial number, and furthermore identification of the current firmware version. It is evident that an unauthorized person must not be able to change the manufacturer name, product type and serial number. This may be obtained by coding these data into the chip. Alternatively it may be achieved that only authorized personnel may edit Product ID data by applying an appropriate data access control.

Finally the hearing aid memory 123 includes memory space 113 for storing log data for the hearing aid operation and acoustical environment, and memory space 114 for storing a security element as root certificates as explained later. The hearing aid 10, 11 generates these log data automatically, and the data may be read out during a consultancy session by an audiologist when adjusting the settings for alleviating a hearing loss, or by uploading to a central server when the manufacturer of the hearing aid 10, 11 prepares for a firmware update.

The processor 121 is connected to and controls the operation of a transceiver 122. The transceiver 122 connects the hearing aid 10, 11 to a personal communication device 13 via a wireless connection 14, such as a per se known wireless communication standard like Bluetooth™ Low Energy or another appropriate protocol. The benefit of using Bluetooth™ Low Energy is that many different personal communication devices 13 like smartphones, hearing aid streamers, tablet PC's and laptops already support the standard, whereby the hearing aid 10, 11 may be paired with one of these personal communication devices 13 and use the personal communication device 13 as a gateway to the Internet. On the same time the power consumption for a transceiver 122 based upon Bluetooth™ Low Energy will be acceptable for a hearing aid design.

The personal communication device 13 according to the invention is Internet enabled, which means that the personal communication device 13 may access the Internet 16 via a connection 15. The connection 15 is preferably a wired (e.g. LAN), a wireless Internet connection (e.g. WLAN such as $802.11_{a, b \text{ or } g}$), or a cellular data connection (e.g. WCDMA or LTE). Advantageously, the personal communication device 13 has the ability to download and launch application software from a remote server on the internet, e. g. an app store 28. Furthermore, the personal communication device 13 will be able to access via the Internet 16 a master server 25 having user data storage 26 for maintaining and storing hearing aid user accounts.

The term "app" is short for application software which is a set of one or more programs designed to carry out operations for a specific application. Application software cannot run on itself but is dependent on system software to execute.

Figure 2:
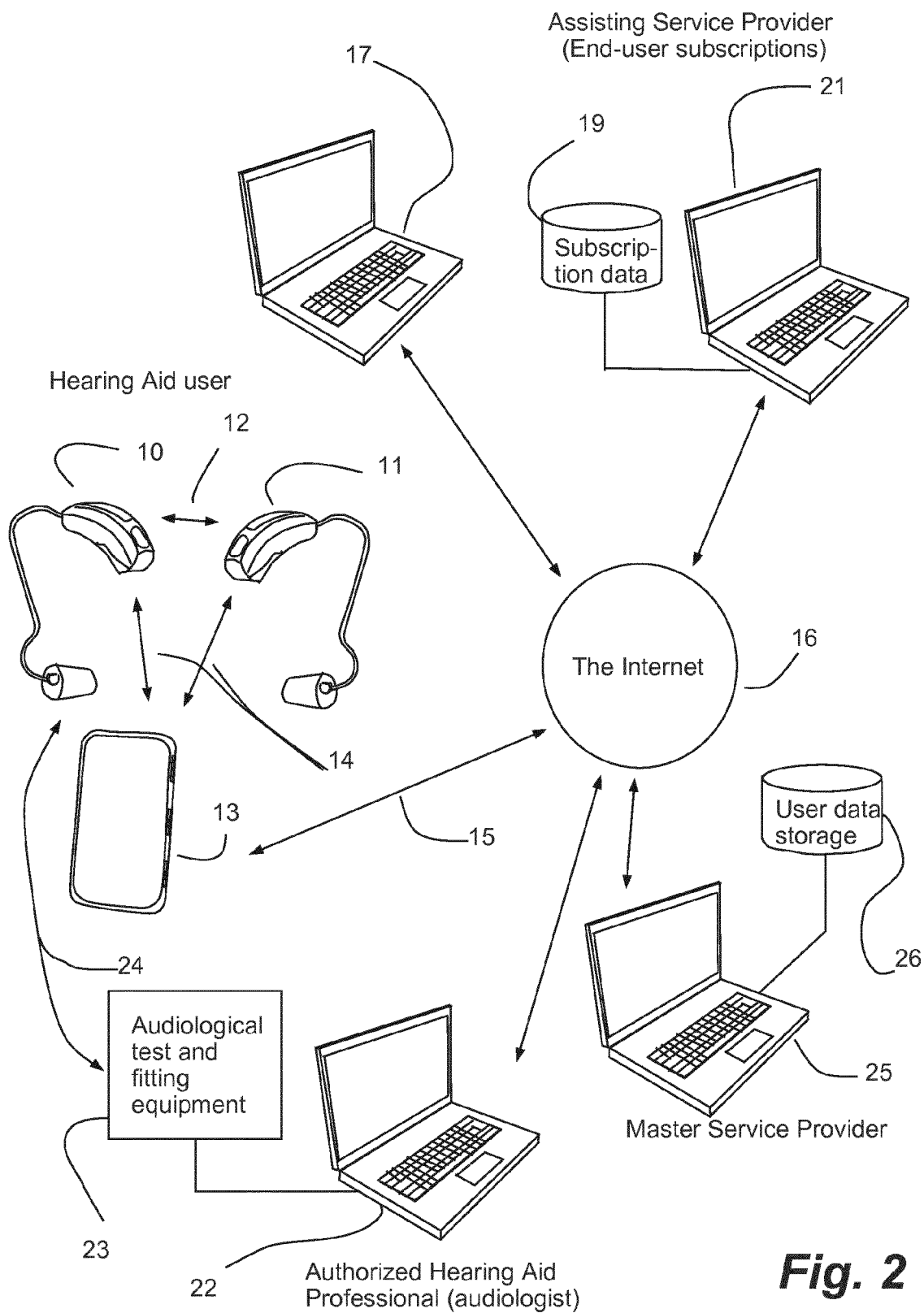
FIG. 2 illustrates schematically a data management system according to a second embodiment of the invention.

FIG. 2 shows two hearing aids 10 and 11, and these are preferably provided as a set of binaural hearing aids having and inter-ear communication channel 12, advantageously based on a proprietary communication protocol or the Bluetooth™ Low Energy protocol, which is preferred for the communication between two hearing aids 10 and 11 and the personal communication device 13—here shown as a smartphone. By using a proprietary communication protocol for the inter-ear communication channel 12, it is possible to optimize the inter-ear communication channel 12 with regard to power consumption, while by using the Bluetooth™ Low Energy protocol for the inter-ear communication channel 12, it is possible to reduce the number of radios required in the hearing aid. The two hearing aids 10 and 11 are illustrated as Behind-The-Ear hearing aids having customized ear plugs. However the invention is applicable for any type of hearing aid being able to communicate with the personal communication device 13 via the wireless connection 14.

Furthermore, the hearing aid user may from a computer 17 via an appropriate Internet connection access the master server 25 having user data storage 26 for maintaining and storing hearing aid user accounts. Accessing user data stored on the master server 25 requires that the hearing aid user has the required access rights.

Entities distributing the hearing aids from the manufacturing companies to the hearing impaired customer may, as assisting service providers dealing with e.g. end-user subscriptions from a computer 21 via an appropriate Internet connection, access the master server 25 having user data storage 26 for maintaining and storing hearing aid user accounts—or at least relevant parts of the hearing aid user accounts. The computer 21 is connected to a data storage 19 containing subscription data for a plurality of hearing impaired customers being customers at the entity. The entity may be a specialty store, a factory owned store, a supermarket, a membership warehouse club, a discount store or the like. Accessing user data stored on the master server 25 requires that the hearing aid user has proper/appropriate access rights.

Finally, authorized hearing aid professionals or audiologists may from a computer 22 via an appropriate Internet connection access the master server 25 having user data storage 26 for maintaining and storing hearing aid user accounts. Accessing user data stored on the master server 25 requires that the hearing aid user has the appropriate access rights. The authorized hearing aid professionals have audiological test and fitting equipment 23 for measuring and estimating the hearing loss of the customer, and subsequently fitting a set of hearing aids 10, 11 compensating for the unique hearing loss of the customer. As the fitting process shall fulfil the customer's needs, the process will normally take place as an interactive and iterative process. Therefor the audiological test and fitting equipment 23 is adapted for wireless communication directly with hearing aids 10, 11 via a data link 24. The data link 24 may be provided by means of a proprietary communication protocol used for the inter-ear communication channel 12, or by means of the Bluetooth™ standard, e.g. according to Bluetooth™ Low Energy protocol, which is preferred for the communication between two hearing aids 10 and 11 and the personal communication device 13.

Hereby the authorized hearing aid professional will be able to write new data into and edit existing data in the data file 110 defining the hearing compensation profile in the hearing aid memory 123.

The authorized hearing aid professional will be able to edit existing data in the memory space 111 for storing status about activated hearing aid programs. The distributing entities will have read access to the content present in the data file 110 and the settings in the memory space 111, as these data are relevant for the feature set of the hearing aids and thereby for the sales price or the subscription fee the user has to pay for the using the hearing aid 10, 11 having the feature set specified by the authorized hearing aid professional. As it will be explained later, these data stored in the hearing aid 10, 11 will become uploaded to the master server where the hearing aid manufacturer can inspect the data and automatically charge the distributing entities responsible for a specific hearing aid having a feature set specified by the authorized hearing aid professional.

Figure 4:
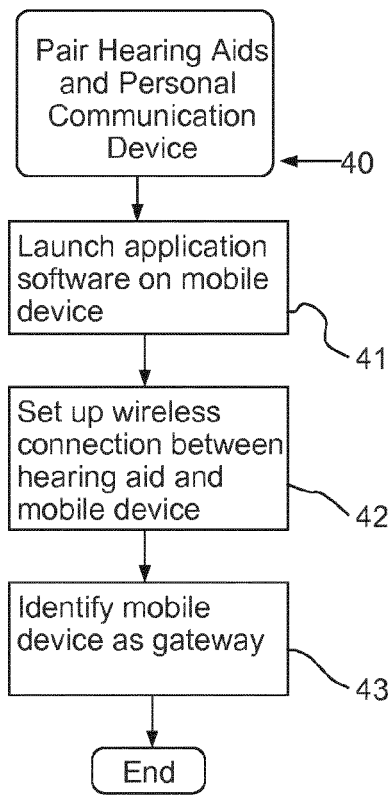
FIG. 4 illustrates a flow chart for the pairing of a hearing aid and the personal communication device according to one aspect of the invention.

According to the invention, the user pairs—in step 40 of FIG. 4—a set of hearing aids 10, 11 to a personal communication device 13, and the pairing procedure according to Bluetooth™ Low Energy protocol is well known. However, the user may advantageously choose to use special hearing aid software running on the personal communication device 13 adapted to control the pairing—as shown in step 41—and this software may either be embedded in the personal communication device 13 from the factory or be downloaded to the personal communication device 13 from the app store 28. The software app includes information about how to access (including the internet address) the master server 25. Upon pairing in step 42 of the set of hearing aids 10, 11 and the personal communication device 13, the set of hearing aids 10, 11 identify themselves based upon information present in the product ID file 112 in the hearing aid memory. The software app running on the personal communication device 13 uploads in step 43 these data to the master server 25 based upon access information contained in the software app. Hereby the master server 25 becomes notified about that pairing has taken place between the set of hearing aids 10, 11 and the personal communication device 13, and the set of hearing aids 10, 11 is identified by manufacturer, hearing aid model, serial number, software version, and the personal communication device 13 is identified (phone number and/or IP address) as gateway for accessing the set of hearing aids 10, 11.

In one embodiment, the pairing is done by bringing the personal communication device 13 via the launched application software into a searching mode, in which the personal communication device searches for hearing aids 10, 11 in pairing mode. Preferably a hearing aid 10, 11 is brought into pairing mode for a period of time by switching the hearing aid on. The hearing aid 10, 11 may preferably remain in pairing mode between 30 seconds and 2 minutes. The personal communication device 13 may list the hearing aids 10, 11 identified in pairing mode. Then the pairing preferably takes place by requesting the hearing aid 10, 11 to communicate a pairing code in an auditory communication, e.g. as an audio message, to the hearing aid user, and when the user has successfully entered the pairing code via a graphical user interface on the personal communication device 13, the pairing mode has been successfully completed. If the set of hearing aids 10, 11 includes a second one, the pairing step is repeated for this one, too. Preferably, the hearing aids 10, 11 provide an audio indication to the user when the hearing aid enters the pairing mode, and preferably also when the pairing mode has been successfully completed.

Upon setting up a wireless connection between at least one hearing aid 10, 11 and the personal communication device 13 under guidance of application software, the master server 25 identifies in the user account the personal communication device 13 as a gateway for the hearing aid 10, 11 to the Internet 16. So far only the set of hearing aids 10, 11 and the personal communication device 13 are identified in an anonymous user account.

Figure 5:
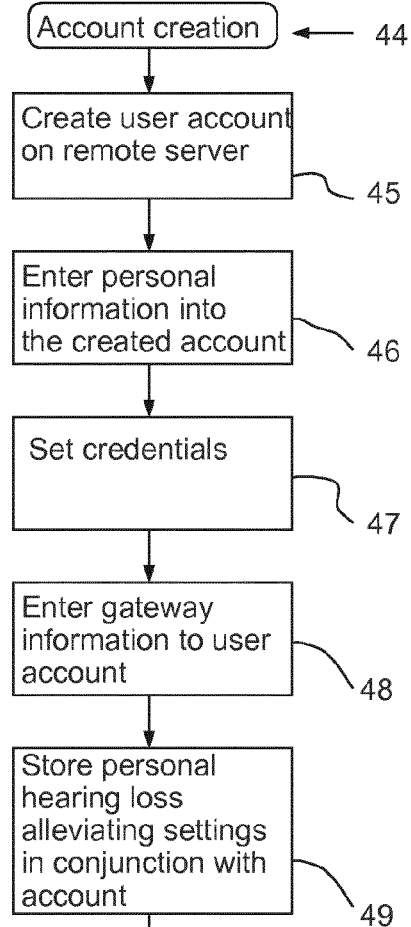
FIG. 5 illustrates a flow chart for the creation of a user account according to one aspect of the invention.

Referring to FIG. 5, it shall be explained how the user completes the account set-up. Starting at step 44, the user creates a user account on the remote server 25 accessible over the Internet from the Internet enabled computer device 17, e.g. a laptop, tablet PC or a smartphone. The user enters a URL provided on the hearing aid sales package into an appropriate browser window in order to create the account at the master service provider. In the web page opened, the user may create a new account in step 45 and enter appropriate personal information in step 46. The kind of personal information included in the user account will later on be explained with reference to FIG. 3. As a part of the account set up, the user is in step 47 invited to set credentials for the account, and these credentials may in one embodiment include a username and a password—both specified by the user. Now the account has been created, the user is allowed to log off, and later on log on again for complementing the account with additional data. During the account setup, in step 48 the user is invited to identify a gateway to his hearing aids 10, 11. The personal communication device 13 serves this purpose, and the user may identify the personal communication device 13 by means of e.g. its phone number or IP-address.

Once the personal communication device 13 has been identified as a gateway, the remote server 25 contacts the personal communication device 13 in order to verify its role as a gateway. This contact may preferably be done via the software app running on the personal communication device 13, and when the user has verified the gateway data, the personal communication device 13 starts to load data about the hearing aids 10, 11, such as serial number, software version and information about special hardware. Normally the hearing aids 10, 11 have been fitted in order to alleviate the hearing loss of the hearing aid user, and as a part of the account set-up, the personal communication device 13 reads data from the hearing aids 10, 11, and in step 49 transfers data to the remote server 25 for storing settings for alleviating the hearing loss in conjunction with the user account comprising of a data set 30 consisting of data fields 31-39.

Hereafter the remote server 25, when the hearing aids 10, 11 are online, will via the personal communication device 13 compare the settings for alleviating the hearing loss stored in the hearing aids 10, 11 and in the user data storage 26, and keep these settings synchronized. Hereby these data will be kept updated no matter whether the hearing aids 10, 11 have been updated in an off-line fitting process, or whether a new fine-tuning has been performed orchestrated by the remote server 25.

Figure 8:
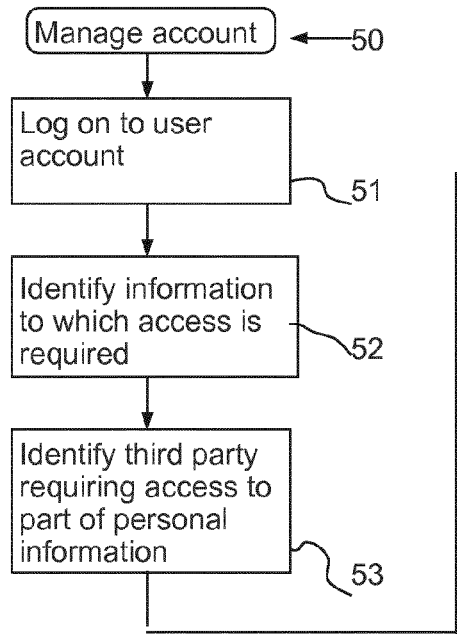
FIG. 8 illustrates a flow chart for the management of a user account according to one aspect of the invention.

The user is allowed to log off, and later on log on again for editing existing data in the account or for adding further data. With reference to FIG. 8, it will be explained how the user may manage his account in step 50. This requires that the user logs on to his account in step 51, and the web page will for this purpose have a tab named "delegate access" to the user account comprising a data set 30 consisting of data fields 31-39. In step 52, accessing certain parts of the user account will require authorization—for example when modifying the settings for alleviating the hearing loss, and the user will in step 53 only be allowed to select from a predefined list of authorized entities such as authorized audiologists or hearing aid professionals permitted to fit hearing aids. Other parts of the user account will require some commercial relationship with the hearing aid manufacturer and master service provider managing the remote server 25, and here the assisting service provider may handle the sale or a subscription or service agreement to the end-user. Also here, the assisting service provider may be selected from a predefined list of assisting service providers in step 53. The assisting service provider sells or rents a set of customized hearing aids 10, 11 to the hearing aid user, and as a part of the customization, the assisting service provider may equip the hearing aid with a certain number of audio processing bands and with a certain number of hearing aid programs. These features may be activated via the internet enabled computer 21 from which the assisting service provider may update his own subscription and accounting system and the user account in the remote server 25. Once the user account in the remote server 25 has been updated, the master service 25 sends the necessary activation codes to the hearing aids 10, 11 via the gateway provided by the personal communication device 13.

Preferably, the delegated access rights to the user account are only granted for a certain period of time, therefore the user sets from his Internet enabled computer device 17 the period of time in step 54 according to the needs. If the user signs up for a hearing aid subscription at a membership warehouse club, the minimum commitment period may be six or twelve months, and therefore it makes sense to automatically define the duration of the access rights to the sub-set of the dataset in a user account to be in the same range. Prior to the expiration of the access right period, the user is preferably notified about the expiration, and he may extend the access right with a similar period of time or a user defined period. The renewal of the delegated access rights takes place from the web page having the "delegate access" tab. For the fitting purpose, the audiologist may just need access to the account during the fitting session, and therefore the access rights may preferably be limited to just one day or a few days, or alternatively to just one completed session. However the user may easily extend these access rights if required by logging in to his account.

Once the user, in step 55, has granted access rights to a sub-set of the personal information present in the user account via his Internet enabled computer device 17 to the third party entity, the master server 25 records the period of time for which the temporary access rights will be granted, creates, in step 55, a set of credentials associated with the user account to which the temporary access rights will be granted, and notifies, in step 56, the third party entity about credentials for accessing the sub-set of personal information present in the user account. The third party entity receiving the temporary access rights may be the assisting service provider operating from the internet enabled computer 21 or the authorized hearing aid professional/audiologist operating from the internet enabled computer 22.

In case the access rights relate to a fitting session with access needs for just limited time, the notification may take place as a set of e-mails with a first one linking to the user account in question and a second one containing a password for accessing the user account. A logon name may be available for the fitter in advance, included in the second e-mail or in an additional, separate e-mail.

In case the access rights are granted to an assisting service provider, e.g. a membership warehouse club, providing service to multiple hearing users via sale or subscriptions, the access rights will be granted for long term and the assisting service provider may at the same time have access to a plurality of user accounts, where an assisting service provider already has login credentials providing access to a pool of sub-sets of the personal information present in the plurality of user accounts. Here the notification may take place as a notification in the browser window upon logging into the master service provider home page, and notification provides an update about new accounts that have become accessible.

Figure 3:
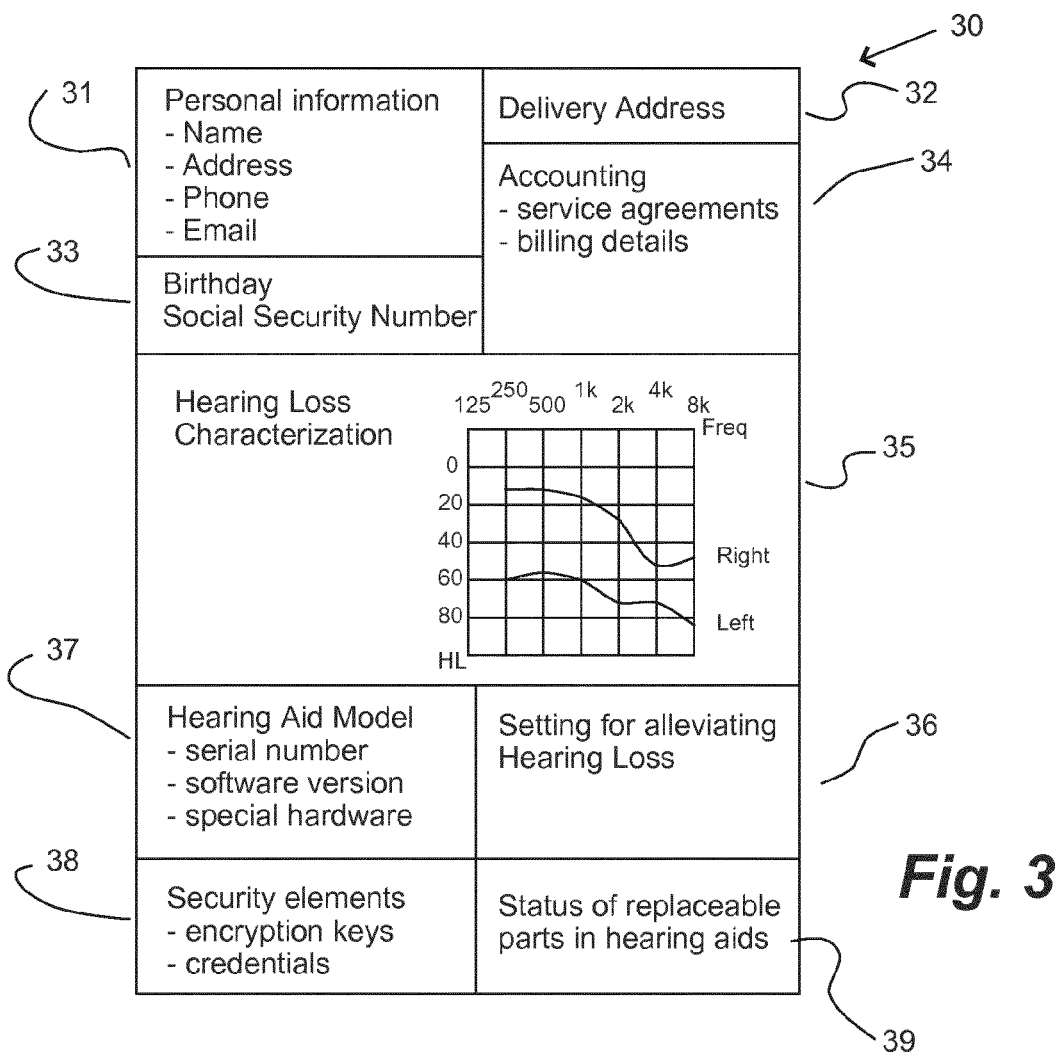
FIG. 3 illustrates schematically the data structure of a user account handled in the data management system according to an embodiment of the invention.

As mentioned above the master server 25 has user data storage 26 for maintaining and storing hearing aid user accounts, and the plurality of hearing aid user accounts defines an end-user database consisting of data developed by individual end-users. The master service provider has the Data Definition Right and is responsible for the data definition, which includes defining, modifying, and removing data structures from the database. As shown in FIG. 3, there is for each user account there defined a data set 30 consisting of data fields 31-39. The hearing aid user is as end-user permitted to update (has the Data Update Right) the data set 30, which means that he can insert, modify, and delete data. The hearing aid user is furthermore permitted to delegate the Data Update Right for his specific user account to third parties like authorized hearing aid professionals and assisting service providers, and to specify that the delegated Data Update Right relates to one or more data fields 31-39 of the data set 30, and that the delegated Data Update Right is for a specified period of time.

For each hearing aid user account there exists some Data Retrieval Rights, which are the rights to obtain information, either for end-user queries and reports, or for adjusting the setting of the hearing aids. The will be some overlapping between the Data Update Right and the Data Retrieval Rights. Finally, the master service provider will, according to one embodiment, hold the Administration Rights for the database. The Administration Rights allow the master service provider to record and monitor user activities. The master service provider enforces data security—including grant of credentials. The master service provider maintains the lists of authorized hearing aid professionals and assisting service providers, ensuring that the parties appearing there have been authorized. The master service provider monitors the performance of the database—including concurrency control maintains data integrity, and recovers information if the system fails.

The data set 30 in a user account includes a personal information data field 31, which typically is the first data field filled out by the user when creating an account. The personal information includes name, address and additional contact data like phone number and e-mail address. A delivery address data field 32 defines the delivery address for hardware to be delivered to the hearing aid user. This hardware may include hearing aids returned from service, replacement hearing aids, batteries, wax guards, hearing aid drying boxes and other items ordered from the master service provider or the assisting service provider. The delivery address is specified by the owner of the account and may be identical to the home address identified in the personal information data field 31 or may identify a preferred supermarket in case the account is linked to a membership in a warehouse club. The owner of the account will have Data Update Rights to the personal information data field 31 and the delivery address data field 32, while the authorized hearing aid professionals and assisting service providers will have the Data Retrieval Rights to these data fields of the data set 30.

In a social security data field 33, the user may enter his birthday information and social security number, which may be used by the social authorities in cases these are committed to pay a part of the sales prize or subscription fees. In an accounting data field 34, the master service provider, the assisting service provider, and the authorized hearing aid professional may enter respective service agreements and the user may enter billing details, such as that an invoice is preferred or that an amount to be drawn from a specified credit card is preferred. The service agreements may refer to a specified fitting session, a hearing test, purchase of a specified set of hearing aids, subscription to a specified set of hearing aids, upgrade of an existing set of hearing aids batteries, or replacement parts. The user has the right to approve the service agreements and enter billing details, while the service providers may enter service agreement details as price and conditions supported by one or more documents and use entered billing details for their own accounting. The accounting data field 34 will only contain one service agreement, and if several service agreements are initiated, supplementing accounting data fields 34 will be created. Only parties to a service agreement do have Data Retrieval Rights.

For some of the service agreements, the database keeps the historical data so the hearing aid user may purchase e.g. batteries from his smart phone by a few clicks on an app, as an existing accounting data field 34 specifies a service level agreement for batteries, the amount of batteries, the delivery address and the payment details.

When the authorized hearing aid professional or audiologist tests the hearing of a client, he obtains the results in an audiogram, which is a graph showing the hearing loss measured in decibels for standardized frequencies in Hertz. The threshold of hearing is plotted relative to a standardized curve that represents "normal" hearing, in dB (HL). According to the invention the authorized hearing aid professional may store the hearing loss characterization in a dedicated Hearing Loss Characterization data field 35, whereby the authorized hearing aid professional or another authorized hearing aid professional on a later point of time may assess changes in the hearing capability of the client.

When the authorized hearing aid professional has determined the hearing loss of his client and an appropriate hearing aid has been chosen, the authorized hearing aid professional sets the hearing aid compensation profile parameters in an interactive dialogue with the client by using the audiological test and fitting equipment 23 communicating directly with hearing aids 10, 11 via the wireless data link 24. Once the fitting has been completed, the settings are stored in the data file 110 defining the hearing compensation profile in the hearing aid memory 123 in each of the hearing aids 10, 11. Once the settings have been updated in the hearing aid 10, 11, and the hearing aid 10, 11 identifies a gateway to the Internet 15 via the personal communication device 13, it seeks to establish a secure connection to the master server 25 for transferring these data to the data field 36 for the settings of the hearing compensation profile for each of the hearing aids 10, 11. The hearing aids are programmed to automatically place a copy of settings of the hearing compensation profile for each of the hearing aids 10, 11 in an associated user account when the settings have been updated off-line (not using the personal communication device 13 as gateway) by means of fitting equipment 23.

Preferably, the data field 36, in which the hearing compensation profiles are stored, includes historical data for the hearing compensation profile settings. Hereby the user may request a previous setting if he for some reasons finds the current setting problematic in a specific sound environment or situation. The request of re-importing a previous setting may be initiated from an app on the personal communication device 13 acting as gateway.

Also the master server 25 will be able to set up a secure connection to the hearing aids 10, 11 for loading settings of the hearing compensation profile into one or more of the hearing aids 10, 11. The trigger for doing such a push of settings may as mentioned be that the user has requested a previously used setting, or that the user has received one or more replacement hearing aids directly from factory, and that these new hearing aids once these are connected to the gateway shall be equipped with appropriate programs and equipped with the appropriate hearing compensation profile settings. This will make a replacement operation easier for the client as the new hearing aids 10, 11 can be delivered by a postal or shipping company and the preparation and personalization of the hearing aids 10, 11 takes place online using a personal communication device 13 as gateway.

The authorized hearing aid professional has via his login Data Update Rights to the Hearing Loss Characterization data field 35 and the hearing compensation profile data field 36, while the owner of the account has Data Retrieval Rights to the Hearing Loss Characterization data field 35.

Preferably, the hearing aids 10, 11 are programmed to automatically upload identification details for the hearing aid to the master server 25 when the hearing aids 10, 11 are linked to a user account by means of the gateway formed by the personal communication device 13. These product ID data are read from the product ID file 112 in the hearing aid memory 123 and uploaded via the gateway and the Internet to the master server 25 and into data field 37 of the user account.

Only the hearing aids 10, 11 do have Data Update Rights to the product ID data field 37 while all having access rights to the account do have Data Retrieval Rights to the product ID data field 37.

For each user account there is provided a data field 38 containing security elements as credentials for access to one or more data fields in the hearing aid user account and secure keys for establishing a secure connection between the master server 25 and the hearing aids 10, 11. The users having access to one or more data fields of the hearing aid user account may access and edit their own user name and passwords only in the data field 38—Data Update Rights and Data Retrieval Rights—but not expand scope and duration of the temporary access rights. The master service provider holds the Administration Rights for the database and will be responsible for that the secure keys in the data field 38 together with the root certificate stored as the security element in the memory space 114 of the hearing aid memory 110 may establish a secure connection between the master server 25 and the hearing aids 10, 11.

According to one aspect of the invention, the hearing aids 10, 11 will report when a hearing aid component, such as a battery or a wax filter, has been replaced. The hearing aids 10, 11 may detect such a replacement by monitoring electrical parameters on a regular basis. Other hearing aid components may have an integrated ID code and may provide the ID code to the hearing aid processor when asked.

The remote server 25 is managing user accounts as explained with reference to FIG. 3, and for tracking the consumption of hearing aid components, the remote server 25 has provided a data field 39 in which the status of one or more of the replaceable hearing aid components is recorded. If the user has bought a package including four packs each containing eight pieces, the start status will be that the user will have 32 wax filters in stock. When one of the hearing aids 10, 11 reports that a wax filter has been replaced, the inventory data field 39 is adjusted accordingly. The remote server 25 calculates an average use based upon the reporting from the hearing aids 10, 11. The replacement frequency for wax filters is highly depending on the individual hearing aid users wax production. Some hearing aid users change the wax filters on a weekly basis, which means that they will use two wax filters per week, and if the delivery from the user has placed the order until he receives the wax filter shipment takes some days, it will be appropriate to remind the user to purchase new wax filter no later than two weeks before the stock runs out—e.g. when the status of the stock shows four remaining wax filters. Then the remote server 25 prepares a priority item for sale (a wax filter package), and once the user has bought the priority item for sale, the status of the stock is updated to be 36 wax filters.

Figure 7:
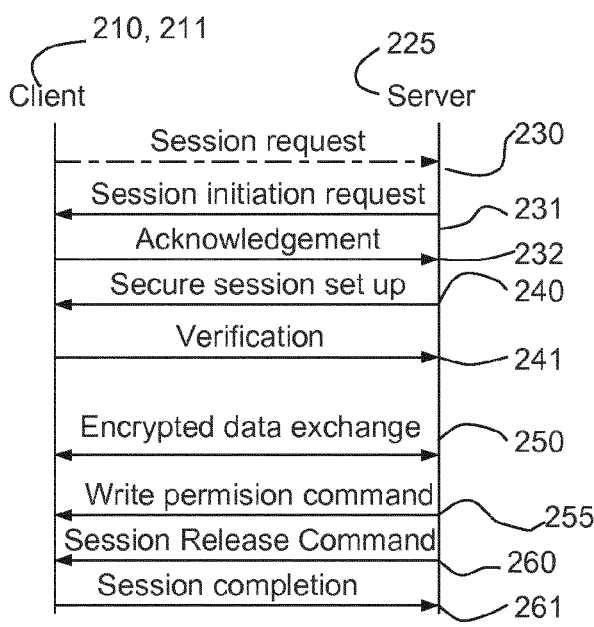
FIG. 7 illustrates the message structure for a secure session according to the invention.

The hearing aids 10, 11 are adapted to ensure that data may only be written in the hearing compensation memory space 110 and program memory space 111 when permitted by the master server 25. This takes place in a secure session as shown in FIG. 7 where encrypted data are exchanged, and where the data transfer is completed when the master server transmits a write permission command 260. Hereafter, the hearing aids 10, 11 may store appropriate data in the hearing compensation memory space 110 and program memory space 111.

Figure 6:
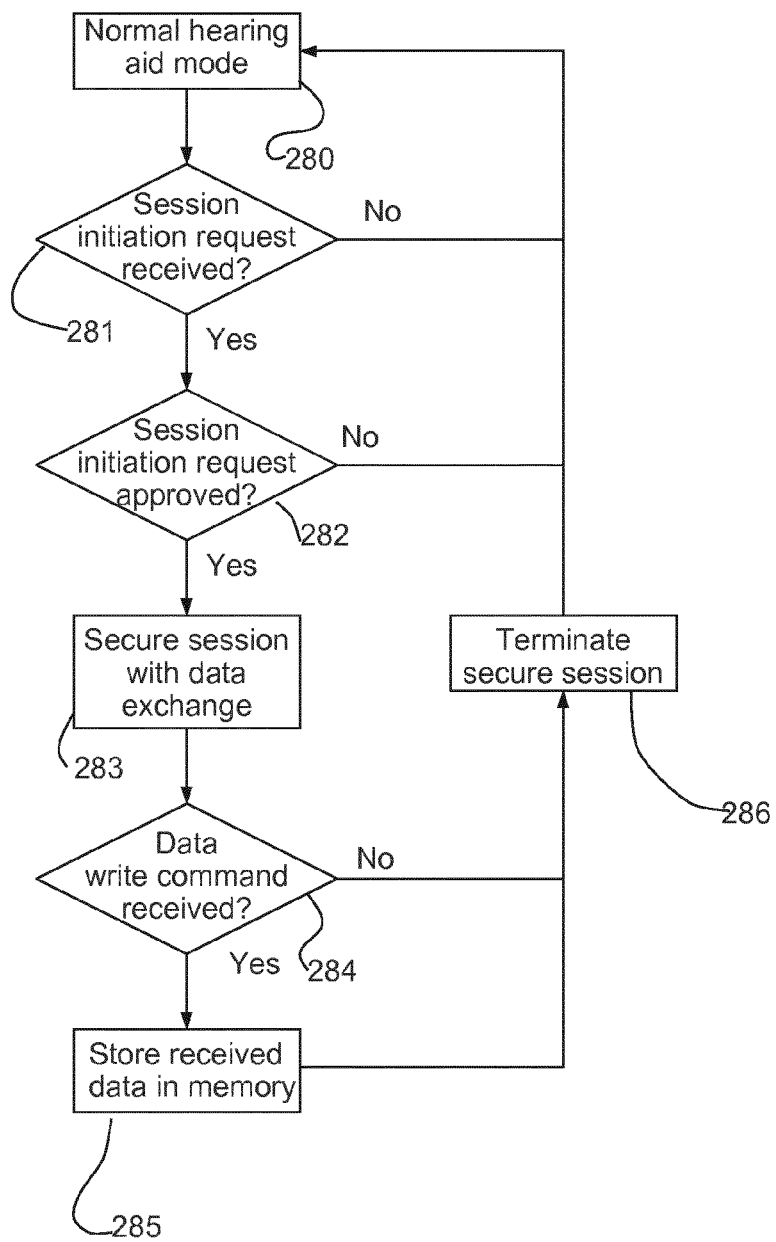
FIG. 6 illustrates a flowchart for the hearing aid during a data exchange session with a remote server according to an embodiment of the invention.

FIG. 6 shows a flowchart for the hearing aid during a data exchange session with a remote server according to the invention. In step 280, the hearing aid 10, 11 is in normal mode which means that the hearing aids reproduce amplified audio picked up from the surroundings or stream audio from an external audio source.

The message structure for a secure session according to the invention is shown in FIG. 7. The hearing aids 10, 11 are here identified as the client 210, 211, and the master server 25 as the server 225. As marked with a broken line the client 210, 211 is allowed to ping (informal request) 230 the server 225 and ask it to set up a secure connection.

However, the method is launched by the server 225 sending a "Session Initiation Request" 231 to the client 210, 211. In step 281, the hearing aid 10, 11 evaluates whether such a "Session Initiation Request" has been received. If this is not the case the hearing aid 10, 11 will resume the normal hearing aid mode in step 280. If a "Session Initiation Request" is deemed to have been received, the hearing aid user is notified on the personal communication device 13 and is allowed to postpone the data exchange, and the hearing aid 10, 11 will resume the normal hearing aid mode in step 280. Also the battery status for the hearing aid 10, 11 is checked, and if neither the hearing aid 10, 11 nor the hearing aid user disapproves the "Session Initiation Request" in step 282, the client 210, 211 sends an "Acknowledgement" message 232 to the server 225.

The purpose of setting up a secure session is to ensure that the hearing aids 10, 11 are protected against unauthorized modifications and fraud. There exist many authentication methods that may be applied when setting up a secure session preferably employing encryption. Such authentication methods include a handshake procedure and subsequent exchange of cryptographic parameters. In one embodiment the server 225 authenticates the client 210, 211 by means of validating its IP-address which is defined by the IP address of the gateway (personal communication device 13). The server 225 initiates the secure session, and the session is set up based upon the root certificate store as the memory part 114 in the hearing aids 10, 11.

Initially, the client 210, 211 and the server 225 have to agree on a protocol version, select cryptographic algorithms, and optionally authenticate each other—which is done by the "Secure Session Set Up" message 240 and the "Verification" message 241. By using private-key encryption techniques, the client 210, 211 and the server 225 generate a shared secret that can be exchanged secretly over the Internet.

In step 283, the client 210, 211 and the server 225 exchange encrypted data 250—"Encrypted Data Exchange" marked by the arrows in both ends indicating that the traffic may go both ways. If the hearing aid 10, 11 has received data for storing, it waits for a "Write Permission" message 255 from the server 225. The "Write Permission" message 255 allows the hearing aid 10, 11 to store data in a specified part of the memory 123. In step 285, the hearing aid 10, 11 writes the received data into appropriate parts of the hearing compensation memory space 110 and program memory space 111. Hereafter the hearing aid 10, 11 will terminate the secure session in step 286 and resume the normal hearing aid mode in step 280.

If a "Write Permission" message 255 is deemed not to have been received in step 284, the hearing aid 10, 11 will shortly after terminate the secure session in step 286 and resume the normal hearing aid mode in step 280 without storing the received data.

The secure session is released by the server 225 sending a "Session Release Command" message 260, and the client confirms the release by sending a "Session Completion" message 261 in step 286.

According to one embodiment, the hearing aid manufacturer may ensure that he is the only one to communicate with the hearing aid for installing software updates and provide settings for alleviating the hearing loss for the hearing aid user. The hearing aid manufacturer will also ensure that he is the only one who can activate and deactivate features and programs in the hearing aids 10, 11 as this affects the price of the hearing aid 10, 11. Therefor the security element 114 is a digital certificate stored in the hearing aid 10, 11 during the manufacturing.

Digital certificates are verified using a chain of trust. The trust anchor for the Digital Certificate is the Root Certificate Authority. A trust anchor is an authoritative entity represented by a public key and associated data. The public key is used to verify digital signatures, and the associated data is used to constrain the types of information or actions for which the trust anchor is authoritative.

The most common type of digital certificates is based on the ITU-T X.509 standard including a digital signature from a certificate authority. The Root Certificate Authority is, according to this embodiment, the hearing aid manufacturer. Hereby the hearing aid manufacturer will be able to issue an ad hoc update for Digital Certificates for a specific set of hearing aids 10, 11, granting certain rights to adjust the settings in the hearing aids 10, 11 during a fitting session.

A Digital Certificate identifies the trust level of an entity seeking to change software or setting in a device. The master server 25 will be associated with a so-called "Trusted" root certificate allowing the master server 25 to establish a chain of trust that is used to verify other Digital Certificates signed by the trusted roots, for example to establish a secure connection to the hearing aids 10, 11. Typically these certificates will be of temporary character, and may be valid for a short period of time—days or weeks—and granted to a specified audiologist or fitter.

The Digital Certificate includes a certificate ID as certificate version, serial number and identification of the signature algorithm used, for example "SHA1 with RSA encryption", and issuer of the certificate. The trust level is indicated as well as a validity period, which includes a start and an end date. A public key for the encryption is identified together with a Certificate Signature Algorithm and a Certificate Signature.

The master server 25 may write data in 110 (adjust hearing compensation settings), 111 (activate programs and features) and 114 (update root certificates).

When the user identifies a fitter or an audiologist and updates his user account as mentioned above, the master server 25 updates the hearing aid memory 123 accordingly by loading a new Digital Certificate, or updates an existing Digital Certificate in the memory part 114 for the secure elements. The rights to enter or edit data in the hearing aid 10, 11 is by means of the new or updated root certificate temporarily delegated to the fitter or the audiologist. The fitter or audiologist is notified about the delegation of rights, when the master server 25 sends a notification of the access rights to the computer 22. As a part of the fitting software, the computer 22 has security elements allowing it to set up an off-line connection to the hearing aids 10, 11, and to include a "Write Permission" message 255 allowing the hearing aids 10, 11 to execute a write command. Then the hearing aids 10, 11 write the received data into appropriate parts of the hearing compensation memory space 110 and program memory space 111 as explained above.

In the embodiment described above the secure session is set up based upon a Root Certificate between the master server 25 and each of the hearing aids 10, 11. This requires that the hearing aids 10, 11 are able to handle the data encryptions themselves.

In an alternative embodiment, the personal communication device 13—e.g. a smartphone—acting as a gateway, has some inherent security tools available, which may assist the master server 25 and the hearing aids 10, 11. Preferably, the secure session is set up by means of a Mobile Virtual Private Network (VPN) whereby the authentication occurs during the establishing of a communication tunnel (tunnel establishment), and before routing data through the VPN gateway provided by the personal communication device 13.

During the secure session (tunnel mode), data is exchanged between the master server 25 and the hearing aid 10, 11 by arranging the data into an IP packet being encrypted and/or authenticated. The encrypted and/or authenticated IP packet is then encapsulated into a new IP packet with a new IP header, and transmitted between the master server 25 and the VPN gateway provided by the personal communication device 13. The communication between the personal communication device 13 and the hearing aid 10, 11 will be less critical as the personal communication device 13 and the hearing aid 10, 11 will be adjacent to each other. Furthermore, inadvertent access to the personal communication device 13 may be prohibited by an appropriate use of passwords or biometric access control.

Tunnel mode is used to create virtual private networks for remote user access (host-to-network communications). The VPN tunnel communication deals with the data security over the Internet. The security elements 114 in the hearing aid 10, 11 ensure furthermore that data received is stored only when a write command is received authenticating the origin of the data as being from the master server 25 or an entity (the computer 22) having temporary writing rights.

Other protocols providing a similar security include IPsec (Internet Protocol Security (IPsec), which is a protocol suite for securing Internet Protocol (IP) communications by authenticating and encrypting each IP packet of a communication session, and SSL (Secure Sockets Layer), which is a protocol for encrypting information over the Internet.

In order to prevent fraud by means of unauthorized fitting equipment 23, the fitting session may according to the invention be based upon a delegation of the right to communicate with a hearing aid 10, 11, according to an embodiment of the invention. When the owner of the user account identifies a hearing aid professional or audiologist authorized to fit a set of hearing aids, the master server sends a notification of the access rights to the computer 22, and in addition to this, the master server 25 sends security elements to the computer 22. These security elements allow the computer to set up an off-line connection to the hearing aids 10, 11, and to include a "Write Permission" message 255 allowing the hearing aids 10, 11 to execute a write command. Then the hearing aids 10, 11 write the received data into appropriate parts of the hearing compensation memory space 110 and program memory space 111 as explained above.

The Internet enabled computer device according to the invention shall be able to access the master server 25 via an appropriate Internet connection. The computer 17 fulfilling this purpose may be a laptop or a tablet computer connected via WLAN to the Internet. In a specific embodiment, the user may access the remote server by means of his smartphone for creating the user account, and as the smart phone also serves as gateway, the very same smartphone may operate as personal communication device 13 during pairing of the short range communication, and as computer 17 during user account establishment and management.

Figure 9E:
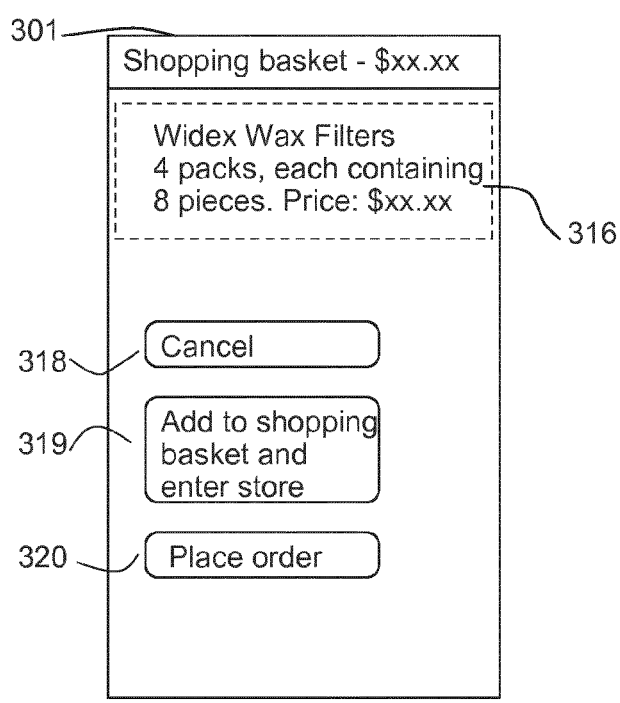

FIG. 9 shows an embodiment for the hearing aid control application software interface used in the Internet enabled personal communication device 13 according to the invention. The hearing aid control application software is illustrated in five schematical screenshots shown in FIG. 9a-9e for a touch screen display. The first screenshot shown in FIG. 9a illustrates a so-called entry screen which is entered when the app is opened. As seen here, the entry screen comprises a header 301 indicating the current operation between the hearing aids 10, 11 and the communication device 13. Here the header 301 indicates that the comfort program for the hearing aids 10, 11 is activated. Below the header 301, there is provided a control area 302 for setting the volume for the sound output by the hearing aids 10, 11. The two columns refer to the left and the right hearing aid 10, 11, respectively. Each of the two columns has a bitmap level indicator 303, can be operated individually by dragging the bitmap level indicator 303 by means of one finger or together by having contact to both bitmap level indicators 303 simultaneously. Below the control area 302, there is provided a dedicated service display area 304 in which the service provider can offer special services or hints to the hearing aid user. The dedicated service display area 304 includes an offer description 305 in which the user is offered a Zen program for tinnitus alleviation, and a selection element 306 for accepting a free trial. The selection element 306 will provide access to terms and conditions, and an assisted set-up of the Zen program.

The first screenshot shown in FIG. 9b illustrates a so-called program selection screen, in which the user may select between programs available. This is indicated in the header 301. The user may e.g. enter the program selection screen from the entry screen by swiping his thumb across the display from left to right. Selectable programs are clustered in a program area 307, selectable audio streaming sources are clustered in an audio streaming source area 308, and further settings are available in a setting area 309. Selections are made by touching one of the labelled controls. If one of the programs or streaming sources is selected or if the return area in the lower right corner is touched, the app entry screen shown in FIG. 9a with the header 301 reflect the selected program of streaming source.

The third screenshot shown in FIG. 9c illustrates a so-called hearing aid store screen, which may be entered by the user from the program selection screen by swiping his thumb across the display from left to right. A header 301 indicates that the user has entered the hearing aid store, and the products are clustered into a battery category, a wax filter category, and ear tip category, and further categories may be available by scrolling out of the screen in downwards direction. Each of the product categories (batteries, Wax filters, ear tips etc.) has a dedicated product display area 310, 314 and 315 including a product offer description 311 in which the user is offered a priority sale offer for the category. For batteries, this offer may be accepted by touching a selection element 313 labelled "Buy", or further offers in the category may be accessed by touching a selection element 312 labelled "Batteries". The same is valid the other categories.

The fourth screenshot shown in FIG. 9d illustrates the entry screen also shown in FIG. 9a. The difference is that the dedicated service display area 304 provides a priority item for sale offer to the hearing aid user, where the offer is based upon the an estimated quantum of items left at the hearing aid user stock, and the quantum and type of replaceable hearing aid components latest bought by the user.

Figure 10:
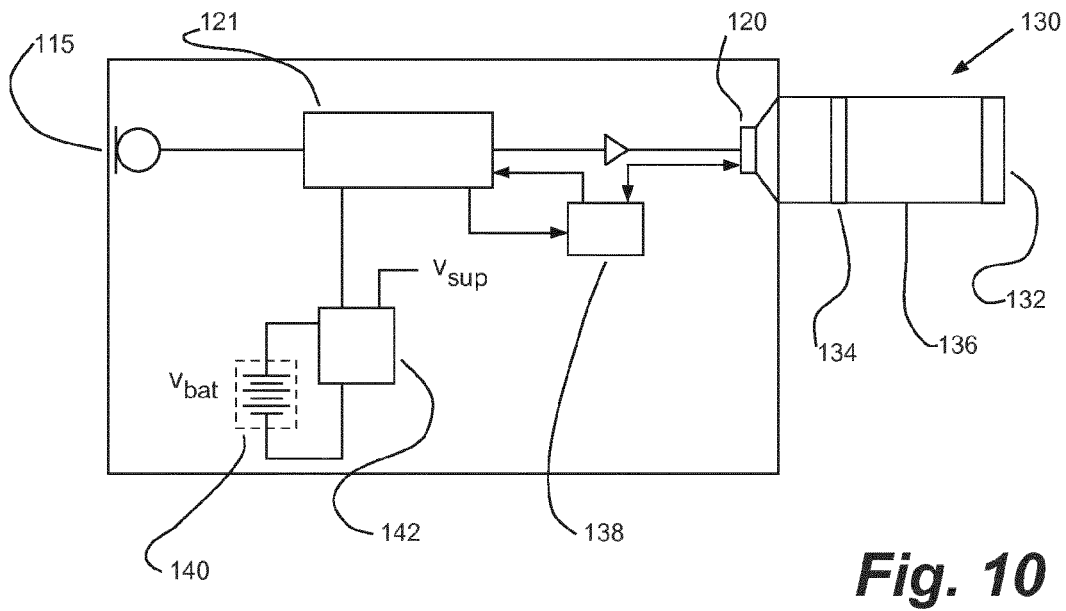
FIG. 10 illustrates an embodiment for a hearing aid for monitoring replacement of replaceable hearing aid components according to the invention.

With reference to FIG. 10, the output transducer 120 outputs acoustical energy into an acoustical system 130 which is located downstream of the output transducer 120. The acoustical system 130 may comprise a wax filter 132 (protecting the hearing aid against blocking due to cerumen), acoustical filters 134 (intended or unintended mechanical constraints) and a sound guide or a tube 136. The tube 136 will have a significant length for a hearing aid 10, 11 of the BTE type (the housing with the loudspeaker is placed Behind the Ear, and the acoustic outlet is provided in an ear plug to be inserted into the ear canal).

An analyzer unit 138 is controlled by the processor 121 and serves to measure the electrical impedance as a function of frequency of the output transducer 120. The analyzer unit 138 provides the corresponding measurement result to the processor 121. The processor 121 produces a status signal representative of the status of the output transducer 120 and the acoustical system 130 cooperating with the output transducer 120. The measured electrical impedance as a function of frequency of the output transducer 120 provided by the analyzer unit 138 is evaluated by the processor 121.

By measuring the electrical impedance of the output transducer 120 as a function of frequency, and by comparing the measured electrical impedance to reference data stored in the hearing aid 10, 11, the processor 121 may analyze the resonance frequency and/or the quality factor of the output transducer 120 and the associated the acoustical system 130.

Such a change in the electrical impedance data will substantially be caused by a mechanical obstruction of the acoustical system 130 associated with the output transducer 120, and the mechanical obstruction will often be caused by ear wax or cerumen. The primary purpose of such a speaker impedance monitoring system is to provide an audible alert to the hearing aid user when the difference between the actually measured electrical impedance data and the stored reference data exceeds a predetermined threshold.

When the user prompted by such an alert attends to the acoustical system 130, e.g. by replacing the wax filter 132 blocked by cerumen, the processor 121 may by analyzing the resonance frequency and/or the quality factor detect that the wax filter 132 has been replaced.

Furthermore, hearing aid 10, 11 has a replaceable battery 140 and a voltage regulator 142 providing a power supply and being powered by the battery 140. The voltage regulator 142 provides a supply voltage, $V_{sup}$, for the hearing aid 10, 11, and the voltage regulator 142 includes a controller for comparing the battery voltage against a plurality of predetermined voltage thresholds. Based upon the battery voltage measurements, the controller is able to detect how the battery voltage fluctuates due to the hearing aid's power consumption, and how the battery voltage decreases over time. When the battery voltage drops below a predetermined threshold, the hearing aid 10, 11 alerts the hearing aid user that it is time to change battery 140. Even though the battery voltage depends on the current drawn from the battery and temperature, the controller will easily be able to detect when the battery 140 has been replaced based upon the battery voltage measurements.

In e.g. computing, plug and play devices are widely employed, and by equipping e.g. the speaker in a Receiver-In Canal (RIC) hearing aid with an electrically readable ID code, the hearing aid processor 121 will easily be able to detect a replacement of such a component when observing a new ID code for the component.

According to one embodiment of the invention shown in FIG. 10, there is provided a hearing aid service system comprising an Internet enabled personal communication device 13 and two hearing aids 10, 11. As explained above the hearing aids 10, 11 each have a processor 121 monitoring electrical hearing aid parameters for detecting a change indicating a replacement of a hearing aid component. These replaceable hearing aid components includes at least the batteries 140 or the wax filters 132.

The hearing aids 10, 11 report the replacement of the hearing aid component via the Internet enabled personal communication device 13 acting as gateway to the remote server 25. In a first embodiment the reporting takes place immediately after a replacement has taken place. In a second embodiment, the hearing aid 10, 11 includes a counter, and the reporting takes place when a predefined number of components have been replaced. In one embodiment, the tally of replacements is kept at the remote server 25, and the communication device 13 is merely transporting the reportings. In another embodiment the communication device 13 is responsible for the counting of used hearing aid components.

Figure 11:
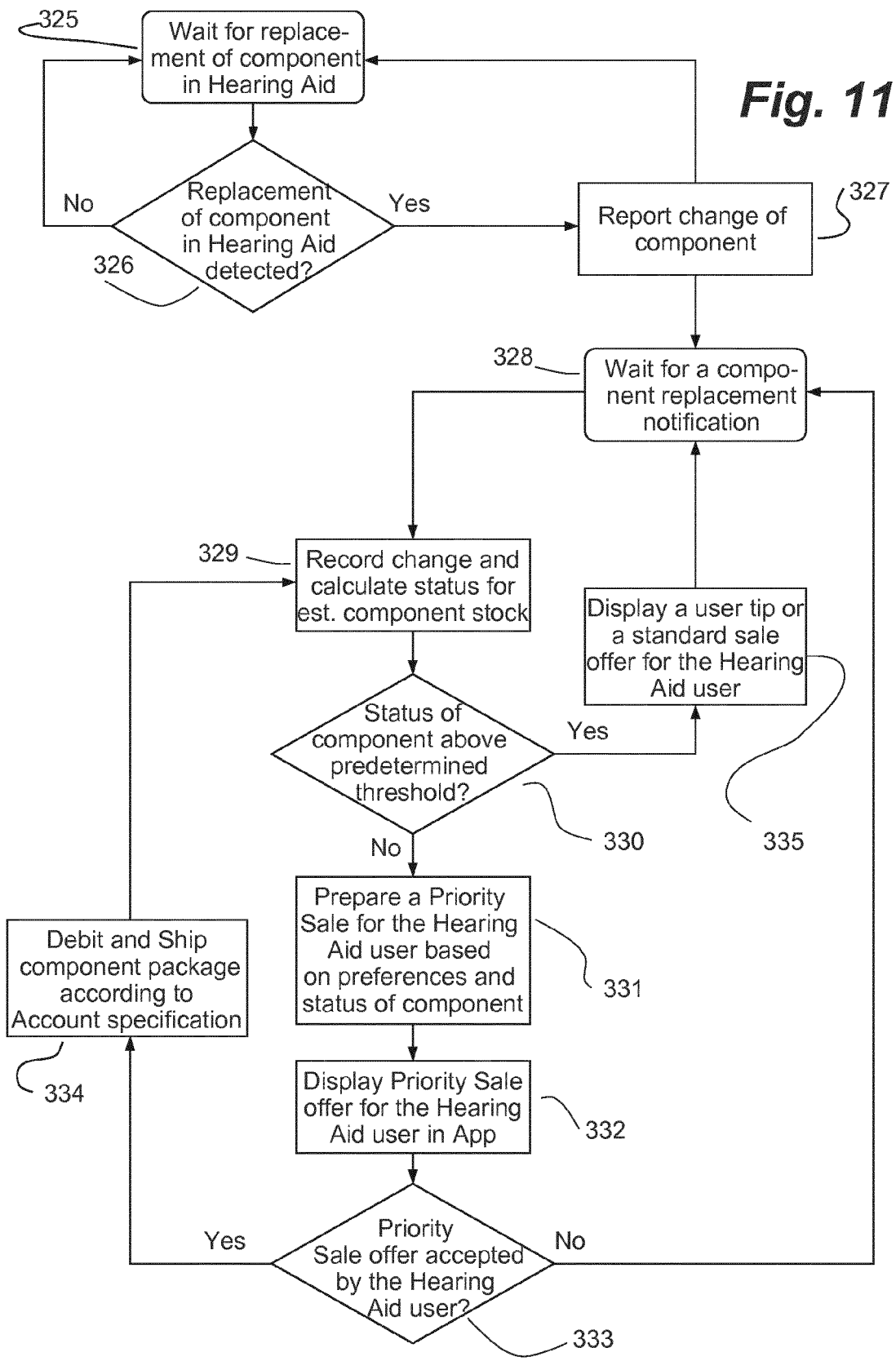
FIG. 11 illustrates a flow chart illustrating the method for offering priority items for sale in a hearing aid service system based on monitoring replacement of replaceable hearing aid components.

FIG. 11 shows a flow chart illustrating an embodiment for monitoring use of replacement parts and offering items where it can be foreseen that the user will run out of these items within days or weeks. As explained above the processor 121 of the hearing aid 10, 11 monitors the status of certain replaceable parts as e.g. wax filters 132 and batteries in step 325 waiting for a change event. In step 326, a replacement of a component is detected when a monitoring algorithm changes a flag. If the changed flag is deemed to represent a replacement of a component, the processor 121 initiates the reporting of a change of a specific component in step 327, and the reporting includes sending a message identifying the component via the wireless connection 14 to the personal communication device 13. As indicated by a dotted arrow, the processor 121 resumes the monitoring state at step 325 and waits for the next change event.

According to one embodiment, the personal communication device 13 acts as gateway for the hearing aid 10, 11, and transfers immediately the message containing the component replacement notification to the remote server 25. The remote server 25 waits in step 328 for receiving the component replacement notification.

In step 329 the remote server 25 receives such a component replacement notification, and identifies the source and the associated account by means of the gateway information contained in the message, and the remote server 25 records the component replacement in the associated user account including calculating status for the estimated component stock the user has for the specific component. This component stock estimate is recorded in the status field 39 in the user account shown in FIG. 3, and is visible for the user. Hereby, the remote server 25 managing user accounts for a plurality of hearing aid users, is also tracking the consumption of replaceable hearing aid components for the individual users. The remote server 25 does also make an on-line store for purchasing hearing aid related goods available for in-app sale via the software app dedicated for the hearing aid remote control. The remote server 25 may know the average shipping time when delivering the ordered goods. These goods may include batteries, different types, label and quantities; wax filters; RIC ear wires, RIC speakers RIC ear pieces; BTE sound guides in different lengths, BTE ear pieces, different types as open, tulip, double or custom. Based on the users purchasing history (type of replaceable hearing aid components, date and quantum), the detected use of replaceable hearing aid components as batteries 140 and wax filters 132, knowledge about the user's type of hearing aid, and user debiting details associated with the user account, the remote server 25 is able to predict the users upcoming needs for replaceable hearing aid components within the coming period. For wax filters, the period of time elapsing between instances of replacements vary from person to person, but due to the received replacement notifications, the remote server 25 will be able to estimate for how long time the user's stock of a specific component will last.

In step 330, the remote server 25 compares the estimated component stock the user has for the specific component, and if this number is below a predetermined threshold, e.g. corresponding to the average use in two weeks, the remote server 25 prepares in step 331 a priority item for sale for the hearing aid user. The priority item for sale is offered based upon the quantum and type of replaceable hearing aid components, e.g. wax filters 132, latest bought by the user.

The remote server 25 pushes this priority item offered for sale, to the communication device 13 which is presenting a hearing aid control application software interface to the user. Next time the user opens the hearing aid control application software interface for controlling his hearing aids 10, 11, the dedicated service display area 304 shown in FIG. 9d, will include an offer description 316 and a selection element 317 for purchasing the offered goods. In this example the user is offered four packs of wax filters. Touching the selection element 317 will bring the user to the fifth screenshot FIG. 9e where the offer description 316 might be slightly more informative. The header 301 indicates that the user by accepting the offer now has entered a shopping basket and also indicates the accumulated value present in the shopping basket.

As may be seen, the fifth screenshot shown in FIG. 9e includes three selection elements 318, 319 and 320. The first selection element 318 allows the user to cancel the transaction by emptying the shopping basket without paying and to return to the entry screen shown in FIG. 9d. The second selection element 319 allows the user to enter the hearing aid store as shown in FIG. 9c with the priority item for sale offer kept in the shopping basket. As the shopping basket is not empty, the header 301 will indicate this and also show the accumulated value present in the shopping basket. The third selection element 320 allows the user to place the order. By touching the third selection element 320, the user will in step 333 accept the priority sale offer, and the communication device 13 sends a message including a purchase instruction concerning said priority item to the remote server 25 for recording in the user account for execution based on user data stored in the account. The shopping basket will then be emptied, and the service provider ships in step 334 the ordered good based upon the data entered into the delivery address data field 32, and debits for the shipped priority item based on the data present in the accounting data field 34.

Hereafter the remote server 25 will update the estimated component stock for the specific component by adding the recently ordered number to the current number. As the estimated component stock for the specific component no longer is below the threshold in step 330, the remote server 25 continues to step 335 and prepares a user pitch or a standard sale offer for displaying in the dedicated service display area 304 of the hearing aid control application software interface of the communication device 13.

The invention claimed is:

1. A hearing aid (10, 11) comprising a transceiver (122) for establishing a short range wireless connection with an Internet enabled personal communication device (13) acting as a gateway for the hearing aid (10, 11) to a remote server (25) accessible over the Internet (16), characterized in that a processor (121) of the hearing aid (10, 11) is configured to monitor electrical hearing aid parameters for detecting that a hearing aid component (132, 140) has been replaced; wherein said processor (121), responsive to detecting the replacement, via the transceiver (122) reports the hearing aid component replacement to the remote server (25) via the Internet enabled personal communication device (13).

2. A hearing aid service system comprising the personal communication device according to claim 1 as well as said hearing aid and said remote server; wherein:
the hearing aid processor is configured for detecting a change of at least one of said electrical hearing aid parameters indicating a replacement of said hearing aid component;
the remote server is configured for managing user accounts for a plurality of hearing aid users, tracking the consumption of hearing aid components for the individual user accounts based at least in part on the reported hearing aid component replacement, and identifying for the user account a priority item for sale based upon the hearing aid component consumption;
the personal communication device is configured for receiving priority item for sale data from the remote server, displaying a selection element associated with the priority item for sale on the control interface, and sending, responsive to a user selection, a purchase instruction concerning the priority item to the remote server; and
wherein the remote server is furthermore configured to record the purchase instruction in the user account.

3. The hearing aid service system according to claim 2, wherein the processor of the hearing aid is configured to monitor electrical impedance as a function of frequency of an output transducer in order to detect a replacement of a wax filter located downstream of the output transducer.

4. The hearing aid service system according to claim 2, wherein the processor of the hearing aid is configured to monitor battery voltage of a battery in order to detect a replacement of the battery.

5. The hearing aid service system according to claim 2, wherein the processor of the hearing aid is configured to monitor a component having an electrically readable ID code in order to detect a replacement of the component.

6. The hearing aid service system according to claim 2, wherein the remote server identifies a priority item for sale by comparing an estimated component stock at the user side of a previously ordered replaceable hearing aid component with a predetermined threshold.

7. The hearing aid service system according to claim 6, wherein the remote server calculates the predetermined threshold corresponding to an average use for a predetermined period of time for the specific hearing aid user associated with the user account.

8. The hearing aid service system according to claim 2, wherein the Internet enabled personal communication device is configured to pitch the priority item for sale in a dedicated display area of the control interface provided by a control application software.

9. The hearing aid service system according to claim 8, wherein the dedicated display area includes a description element pitching the priority item for sale and a selection element for purchasing the offered priority item for sale.

10. The hearing aid service system according to claim 8, wherein the dedicated display area of said hearing aid control interface is present at an entry screen which is entered when the control application software is opened.

11. The hearing aid service system according to claim 8, wherein the priority item for sale is based upon a quantity and type of replaceable hearing aid components last bought by the user.

12. The hearing aid service system according to claim 9, wherein an activation of the selection element for purchasing the offered priority item for sale will open a new page on which the user must press a further selection element for completing the purchase of the priority sale offer.

13. The hearing aid service system according to claim 2, wherein the remote server upon reception of a purchasing instruction concerning the priority item updates the associated user account by:
updating a user-side inventory of the replaced hearing aid component,
debiting the sale, and
ordering shipping.

14. A method for maintenance of at least one hearing aid according to claim 2, wherein the method comprises steps of:
  in the hearing aid:
    monitoring, in said hearing aid processor, at least one of said electrical hearing aid parameters,
    detecting a change of the at least one electrical hearing aid parameter indicating a replacement of said hearing aid component, and
    reporting the hearing aid component replacement to the remote server via the personal communication device;
  at the remote server:
    managing user accounts for a plurality of hearing aid users,
    tracking the consumption of hearing aid components for the individual user accounts based at least in part on the reported hearing aid component replacement, and
    identifying for the user account a priority item for sale based upon the hearing aid component consumption;
  in the personal communication device:
    receiving priority item for sale data from the remote server,
    displaying a selection element associated with the priority item for sale on a control interface of said personal communication device, and
    sending, responsive to a user selection, a purchase instruction concerning the priority item to the remote server; and
  at the remote server, recording the purchase instruction in the user account when received from personal communication device.

15. The method according to claim 14, wherein the step of monitoring at least one electrical hearing aid parameter comprises monitoring an electrical impedance as a function of frequency of an output transducer in order to detect a replacement of a wax filter located downstream of the output transducer.

16. The method according to claim 14, wherein the step of monitoring at least one electrical hearing aid parameter comprises monitoring battery voltage of a battery in order to detect a replacement of the battery.

17. The method according to claim 14, wherein the step of monitoring electrical hearing aid parameters comprises monitoring a component having an electrically readable ID code in order to detect a replacement of the component.

18. The method according to claim 14, wherein the step of identifying a priority item for sale comprises comparing an estimated component stock at the user side of a previously ordered replaceable hearing aid component with a predetermined threshold.

19. The method according to claim 18, further comprising defining said predetermined threshold by calculating an average use for a predetermined period of time for the specific hearing aid user associated with the user account.

20. The method according to claim 14, further comprising presenting the priority item for sale in a dedicated service display area of said hearing aid control application software interface.

21. The hearing aid system according to claim 13, wherein said processor of said hearing aid monitors electrical impedance as a function of frequency of an output transducer in order to detect a replacement of a wax filter located downstream of the output transducer.

22. The hearing aid system according to claim 13, wherein said processor of said hearing aid monitors an electrically readable ID code of said component in order to detect a replacement of the component.

23. The hearing aid system according to claim 13, wherein said processor of said hearing aid monitors battery voltage of a battery in order to detect a replacement of the battery.

24. The hearing aid service system according to claim 2, characterized in that the processor of the least one hearing aid is adapted for alleviating a hearing loss by amplifying sound at frequencies in those parts of the audible frequency range where the user suffers a hearing deficit.

25. A non-transitory computer-readable storage medium having computer-executable instructions, which when executed on an Internet enabled personal communication device causes said personal communication device to perform the steps of: presenting a hearing aid control application software interface to the user at said Internet enabled personal communication device; receiving a replacement notification from a hearing aid, having a processor configured to monitor electrical hearing aid parameters for detecting a replacement of a hearing aid component; uploading the replacement notification to a remote server; displaying on the hearing aid control application software interface, a selection element associated with a priority item for sale; and sending, responsive to a user selection, a purchase instruction concerning said priority item to the remote server for recording in the user account for execution based on user data stored in the account.

26. The computer-readable storage medium according to claim 25, which when executed on an Internet enabled personal communication device causes said device to present the priority item for sale in a dedicated display area of said hearing aid control application software interface.

27. The computer-readable storage medium according to claim 26, wherein the dedicated display area includes a selection element for purchasing the offered priority item for sale.

28. The computer-readable storage medium according to claim 26, wherein the dedicated display area is present at an entry screen which is entered when the control application software is opened.

29. The computer-readable storage medium according to claim 28, wherein activation of the selection element for purchasing the offered priority item for sale opens a new page on which the user must press a further selection element for completing the purchasing of the priority sale offer.

30. A personal communication device being Internet enabled and being adapted for running application software, and including:
  a display for presenting a hearing aid control app interface to the user;
  a processor; and
  a transceiver for establishing a wireless connection with at least one hearing aid under guidance of said application software, whereby the personal communication device becomes a gateway for the hearing aid to a remote server via the Internet;
  wherein the processor is adapted
    to receive a replacement notification from a hearing aid via said transceiver and upload the replacement notification to the remote server;
    to receive a priority item for sale offer from the remote server in response to the uploaded replacement notifications and in response thereto to display the offer in the hearing aid control app interface together with a selection element associated with a priority item for sale; and to send, responsive to a user selection, a purchase instruction concerning said priority item to the remote server for recording in a user account for execution based on user data stored in the account.

\* \* \* \* \*